United States Patent Office.

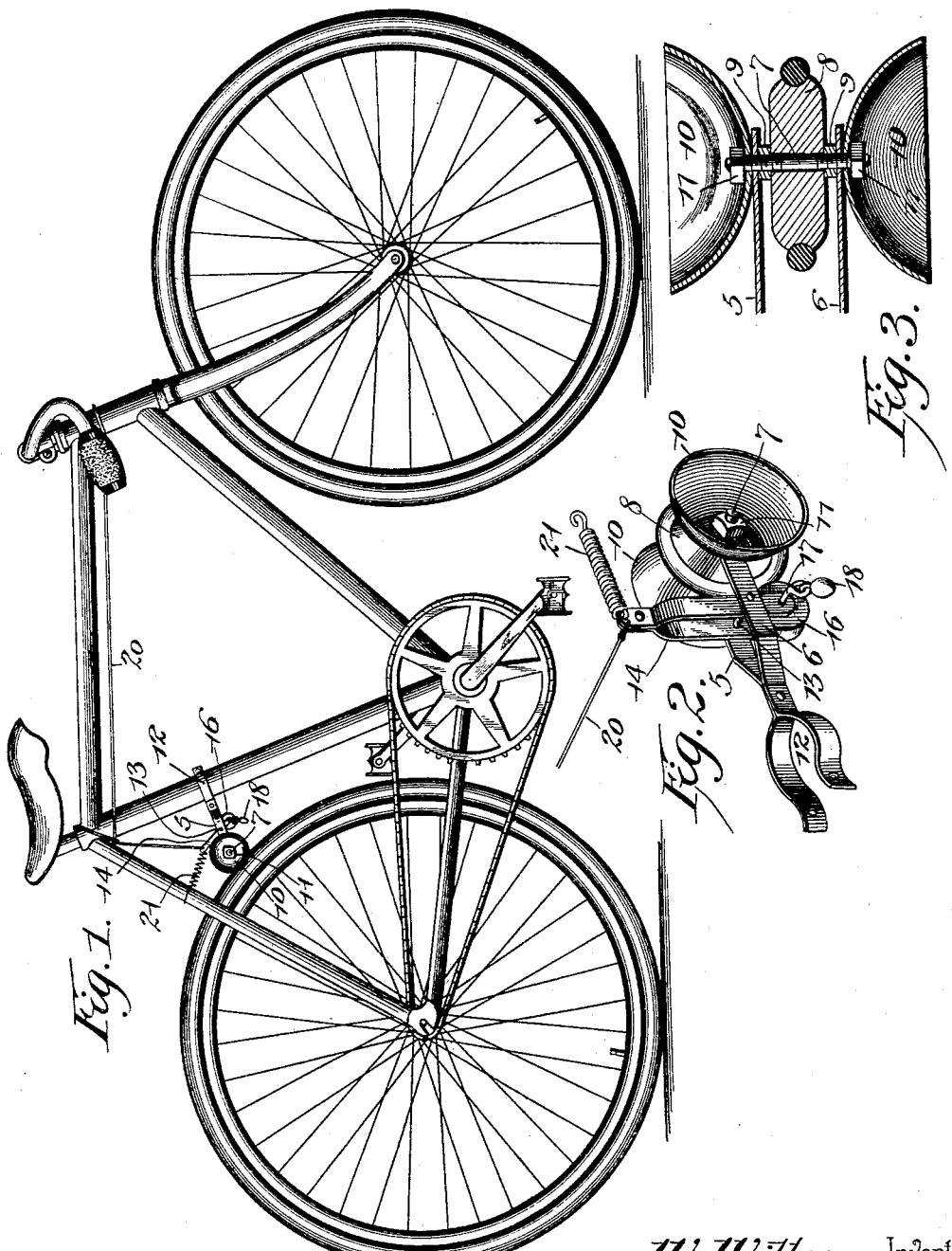

WILLIAM WILTON, OF PLAINSVILLE, PENNSYLVANIA, ASSIGNOR OF ONE-HALF TO FREDERICK E. MITCHELL, OF WILKES-BARRÉ, PENNSYLVANIA.

BICYCLE-BELL.

SPECIFICATION forming part of Letters Patent No. 632,611, dated September 5, 1899.

Application filed July 6, 1899. Serial No. 722,967. (No model.)

*To all whom it may concern:*

Be it known that I, WILLIAM WILTON, a citizen of the United States, residing at Plainsville, in the county of Luzerne and State of Pennsylvania, have invented a new and useful Bicycle-Bell, of which the following is a specification.

This invention relates to bicycle-bells, and particularly to that class known as "wheel-operated bells;" and it has for its object to provide a bell which may be attached to a portion of the frame of a bicycle and which is provided with operating mechanism adapted to be drawn into engagement with an adjacent wheel to operate it.

In the drawings forming a portion of this specification and in which like numerals of reference designate similar parts in the several views, Figure 1 is a side elevation of a bicycle, showing the application of the bell thereto. Fig. 2 is a perspective view of the bell and its operating mechanism. Fig. 3 is a horizontal section of the bell portion with the striking mechanism omitted.

Referring now to the drawings, this device consists of a frame comprising parallel arms 5 and 6, through the rear perforated ends of which is passed a shaft 7, upon which is rotatably mounted intermediate the arms a rubber-tired roller 8, said roller being loose upon the shaft.

To prevent inward movement of the arms against the rollers, nuts 9 are adjusted upon the shaft intermediate the arms and the roller, and upon the ends of the shaft exteriorly of the arms are arranged two outwardly-opening bells 10, through the central perforations of which the ends of the shaft is passed, the bells being held in position by means of nuts 11.

A suitable distance from the periphery of the roller 7 the arms 5 and 6 are bent inwardly and brought together, and in this position they are riveted, as shown. Beyond the rivet connection the arms are bowed outwardly to form a split collar 12, the ends of which are perforated for the reception of a clamping-bolt.

Intermediate the arms 5 and 6 and upon a transverse pin 13 is pivoted a U-shaped frame 14, between the lower ends of which is journaled a roller 16, fixed upon a shaft 17, passed through perforations in the ends of the frame.

The ends of the shaft 17 are bent at right angles thereto and in opposite directions and have pivotally-connected strikers 18 in such a position that when the frame 14 is rocked upon the pin 13 the roller 16 may be moved into engagement with the roller 8 to be rotated thereby, when the strikers 18 will be revolved into and out of engagement with their respective bells 10, this striking being continued so long as the engagement of the rollers is continued and the roller 8 is rotated.

In practice the collar 12 is adjusted to the seat-tube of a bicycle and is clamped thereon, with the roller 8 in engagement with the rear wheel of a bicycle. A cord 20, connected with the upper end of the frame 14, is passed along the top bar of the frame in a position to be readily grasped by the rider of the bicycle and when drawn moves the roller 16 into engagement with the roller 8, the latter being in constant rotation when the bicycle is in motion. So long as the rollers are in engagement the strikers will sound the bells, and when the core 20 is released the frame 14 will act to draw the rollers apart under the influence of a helical spring 21, one end of which is connected with the upper end of the frame 14 and the other end with an adjacent portion of the rear fork of the bicycle.

It will of course be understood that the bell may be applied at whatever point it is applicable, and also that in practice the specific construction and arrangement may be varied without departing from the spirit of the invention.

Having thus described the invention, what is claimed is—

1. A bicycle-bell comprising a frame adapted for attachment to a bicycle, a roller rotatably mounted in said frame, a second frame rockingly mounted in the first frame striking mechanism carried by the second frame and adapted to be rocked into and out of engagement with the roller, and bells carried by the first-named frame and lying in the paths of the strikers.

2. A bicycle-bell comprising a frame adapted for attachment to a bicycle, a roller journaled in said frame, bells arranged coaxially with the roller, a second frame rockingly mounted in the first-named frame, striking mechanism carried by the second frame and adapted to be rocked into engagement with the roller and with the bells, and means for operating the rocking frame.

3. A bicycle-bell comprising a frame adapted for engagement with a bicycle, a roller journaled in said frame, a second frame rockingly mounted in the first-named frame, a shaft journaled in the second frame and having a roller fixed thereto, strikers carried by said shaft, bells carried by the first frame and lying in the paths of the strikers, and means for rocking the second frame to engage its roller with the first-named roller to operate the strikers.

4. A bicycle-bell comprising a frame adapted for engagement with a bicycle, a roller journaled in said frame, a second frame rockingly mounted in the first-named frame, a shaft journaled in the second frame and having a roller fixed thereto, strikers carried by said shaft, bells carried by the first frame and lying in the paths of the strikers, means for rocking the second frame to engage its roller with the first-named roller to operate the strikers, and means for moving the second frame in an opposite direction.

5. A bicycle-bell comprising a frame adapted for engagement with a bicycle, a shaft fixed in said frame and projecting therebeyond, a roller mounted upon said shaft within the frame, bells fixed to the shaft exteriorly of the frame, a second frame rockingly mounted in the first-named frame, a shaft journaled in the second frame and having a roller fixed thereto, strikers carried by said shaft and adapted to engage the bells, and means for rocking the second frame to engage and disengage its roller with respect to the first-named roller to intermittently operate the strikers.

In testimony that I claim the foregoing as my own I have hereto affixed my signature in the presence of two witnesses.

WILLIAM WILTON.

Witnesses:
AUGUSTINE P. CONNIFF,
THAD. M. CONNIFF.